No. 607,615. Patented July 19, 1898.
K. CHICKERING.
FLY WHEEL.
(Application filed Dec. 27, 1897.)
(No Model.)
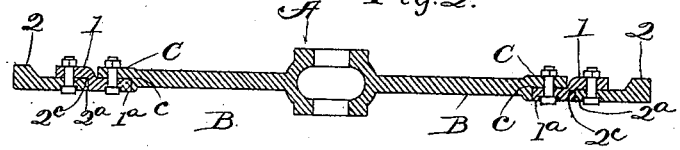
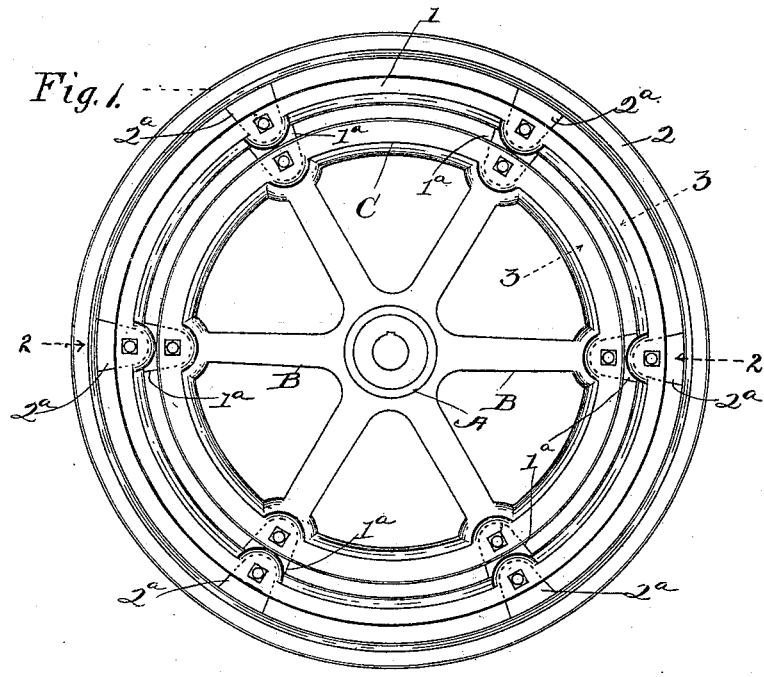
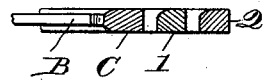
WITNESSES:
F. L. English
C. H. Merchant
INVENTOR
Kenton Chickering.

UNITED STATES PATENT OFFICE.

KENTON CHICKERING, OF OIL CITY, PENNSYLVANIA.

FLY-WHEEL.

SPECIFICATION forming part of Letters Patent No. 607,615, dated July 19, 1898.

Application filed December 27, 1897. Serial No. 663,705. (No model.)

*To all whom it may concern:*

Be it known that I, KENTON CHICKERING, a citizen of the United States, residing at Oil City, in the county of Venango, State of Pennsylvania, have invented certain new and useful Improvements in Fly-Wheels; and I hereby declare the following to be a full, clear, and exact description of the same, reference being had to the accompanying drawings, in which—

Figure 1 is a side elevation of a fly-wheel embodying my invention. Fig. 2 is a diametrical central section taken on the line 2 2, Fig. 1, through the hub, spokes, and radial lugs of the detached supplemental rims or rings; and Fig. 3 is a sectional view of the rims or rings on the line 3 3, Fig. 1.

Like symbols refer to like parts wherever they occur.

My invention relates to the construction of that class of balance or fly wheels so constructed as to be weighted to correspond with the varying work or load of the machine, and has for its object the production of a simple, safe, and efficient fly-wheel the weight and diameter of which may be uniformly increased or diminished at will by unskilled labor and with the certainty that the weight added or subtracted will not disturb the balance of the wheel.

So far as I am aware the method generally adopted to increase the weight of fly-wheels, and particularly where used with drilling-engines or such machinery as are subjected to a gradually-increasing load, has been by bolting or otherwise attaching weights or a segmental rim to either the inside or outside (or both) of the rim of the light fly-wheel, thus increasing the weight without materially and practically increasing the diameter of the fly-wheel or obtaining the maximum of effectiveness from the added weight. Furthermore, such additions tend to disturb the balance of the wheel unless judiciously and skilfully applied, as well as to increase the liability to accident. To overcome these several objections and produce a safe, simple, and economic fly-wheel, I combine with the usual or any approved form of light fly-wheel a plurality of detached and detachable concentric continuous rings or rims provided with inwardly-projecting radial arms or lugs, the added rims or rings being of substantially equal cross-section, whereby said rims or rings are secured to the light fly-wheel and to each other and the weight of the fly-wheel progressively increased proportionally with its diameter, and such a construction or its equivalent embodies the main feature of my invention.

I will now proceed to describe my invention more fully, so that others skilled in the art to which it appertains may apply the same.

In the drawings, A indicates the hub, B the spokes, and C the rim, of any approved form of fly-wheel, in the present instance the usual cast wheel, having the hub, spokes, and rim integral. To such a fly-wheel or its equivalent, which I will term the "light" fly-wheel, signifying thereby simply one whose weight corresponds with the minimum load of the machine with which it is to be employed, I add a plurality of detached supplemental concentric rims 1 2, each provided with a series of radial inwardly-projecting lugs or short arms $1^a$ $2^a$, by which the first ring is supported from and detachably connected to the rim C of the light fly-wheel. The cross-sections of the respective added rings 1 2, &c., are substantially the same, the weight of the ring or rim as a whole being determined by its diameter, so that the weight of the fly-wheel is progressively increased or decreased proportionally with its diameter and its work.

Preferably the rim C of the fly-wheel is recessed at points in line with the spokes B, as at $c$, to afford seats for the reception of the arms or lugs $1^a$ of the first detached ring, and the succeeding rims or rings 2 are in turn and at corresponding points recessed, as at $2^c$, to form seats for the reception of the inner ends of the arms or lugs $2^a$, so that when the detached supplemental rings are connected together and to the light fly-wheel by the bolts 3 or other suitable means the short arms $1^a$ $2^a$ are in effect continuations of the spokes C, and the outer face of the fly-wheel is plain or flush, whereby the strength and finish of the fly-wheel are materially enhanced.

By reason of the construction hereinbefore pointed out I am able to produce a fly-wheel which can be reduced below or extended beyond the average diameter and weight to meet the requirements of drilling or like engines, where a fly-wheel of varying weight is an absolute necessity.

Having thus described my invention, what I claim, and desire to secure by Letters Patent, is—

A fly-wheel adapted to be varyingly increased in diameter proportionally, and comprising a rim composed of a series of attachable and detachable rings of substantially uniform cross-section, substantially as set forth.

In testimony whereof I affix my signature, in presence of two witnesses, this 25th day of December, 1897.

KENTON CHICKERING.

Witnesses:
J. R. CAMPBELL,
JAMES HAMILTON.